United States Patent [19]

Larson et al.

[11] 4,182,393
[45] Jan. 8, 1980

[54] PNEUMATIC RUBBER TIRE WITH ADHERENT POLYURETHANE SIDEWALL

[75] Inventors: William M. Larson, Hudson; George P. Patitsas, Kent; Raymond B. Roennau, Stow, all of Ohio

[73] Assignee: The Goodyear Tire & Rubber Company, Akron, Ohio

[21] Appl. No.: 877,057

[22] Filed: Feb. 13, 1978

[51] Int. Cl.² ............................................. B60C 13/00
[52] U.S. Cl. ............................... 152/353 R; 152/374;
152/DIG. 12; 156/116; 156/128 P;
428/423 260/37N; 525/130
[58] Field of Search .................. 152/330 R, 353, 374,
152/DIG. 12; 156/110 R, 116, 123, 128 P, 331;
428/423, 424, 425; 260/859 R

[56] References Cited
U.S. PATENT DOCUMENTS

| | | | |
|---|---|---|---|
| 2,700,997 | 2/1955 | Morrissey et al. | 152/DIG. 12 |
| 3,632,845 | 1/1972 | Browsword | 528/67 |
| 3,648,748 | 3/1972 | Lovell | 152/330 |
| 3,764,455 | 10/1973 | Lovell et al. | 152/DIG. 12 |
| 3,806,486 | 4/1974 | Endriss et al. | 152/330 R |
| 3,979,547 | 9/1976 | Roberts et al. | 156/117 |
| 4,004,627 | 1/1977 | Sandstrom et al. | 156/116 |
| 4,035,440 | 7/1977 | Khanna et al. | 260/859 R |
| 4,131,149 | 12/1978 | Roberts | 152/DIG. 12 |

Primary Examiner—John E. Kittle
Attorney, Agent, or Firm—H. C. Young, Jr.

[57] ABSTRACT

A pneumatic rubber tire having a polyurethane inlay laminate on at least one of its sidewalls. Said polyurethane inlay is applied as a hot melt of a polymer blend comprised of a thermoplastic polyurethane and an uncured halobutyl rubber.

9 Claims, 1 Drawing Figure

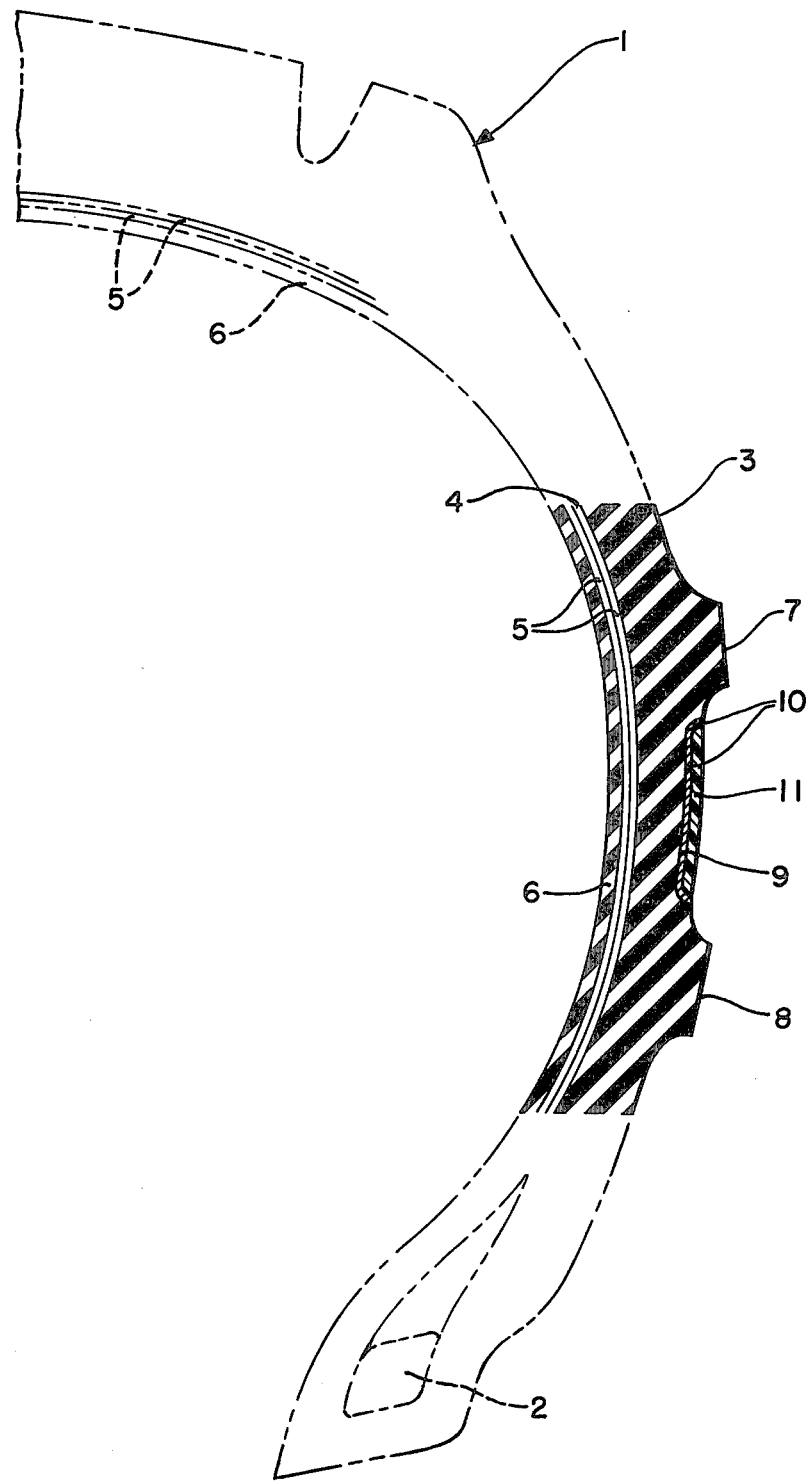

PNEUMATIC RUBBER TIRE WITH ADHERENT POLYURETHANE SIDEWALL

This invention relates to pneumatic tires and particularly to pneumatic tires having contrasting colored sidewalls. The invention more particularly relates to pneumatic rubber tires having adherent polyurethane inlay sidewalls.

Pneumatic rubber tires having adherent polyurethane sidewall laminates have been described where the polyurethane is applied to a cured tire as a reaction mixture which is then reacted and cured on the tire to form the adherent polyurethane laminate (U.S. Pat. No. 3,648,748).

However, it is an object of this invention to provide a pneumatic rubber tire having an adherent outer polyurethane sidewall laminate surface as a departure from such a description.

In accordance with this invention, a pneumatic rubber tire, having a ground contacting tread portion, spaced beads, and inner-connecting sidewall portions extending radially from said tread portion to said spaced beads and an inner, reinforcing carcass portion extending from bead to bead, at least one of said sidewalls having an adherent outer surface of a polyurethane inlay laminate thereon where said adherent inlay is provided by applying, as a hot melt, a polymer blend comprised of 100 parts by weight thermoplastic polyurethane, and, correspondingly, about 10 to about 150, preferably about 90 to about 110, parts by weight of an uncured halobutyl rubber into a groove in the outer surface of a cured rubber pneumatic tire sidewall.

Preferably, the said polymer blend, at about 25° C., has a 100 percent modulus within about 25 percent of the 100 percent modulus of the cured rubber of the sidewall to which it is to be adhered. In this regard, it is generally preferred that the polymer blend, at about 25° C., has a 100 percent modulus in the range of about 200 to about 600 psi. In other words, it is preferred that the polymer blend has a tensile strength in the range of about 200 to about 600 pounds per square inch at an elongation of 100 percent. In addition, it is preferable that the polymer blend contains about 10 to about 150, preferably about 20 to about 110, parts by weight inert fillers and pigments, such as various coloring pigments as well as silicates and clays in particulate or granular, powder-type form, based on 100 parts by weight of the polymer blend.

In the practice of this invention, the thermoplastic polyurethane/halobutyl rubber blend is applied by the stepwise method which comprises the steps of (A) buffing the tire sidewall groove to abrade away a portion of the rubber, to roughen the rubber surface and to remove residual release agents and oils from the surface of cured rubber tire, (B) removing the buffing dust, (C) optionally, cleaning the groove surface with a solvent to remove residual mold release agents and/or oils, if this had not already been accomplished by the preceding buffing operation, (D) treating the buffed surface with chlorine water containing about 0.5 to about 2 weight percent free chlorine and drying the treated rubber, (E) optionally, applying an adhesive of a solvent solution of a thermoplastic polyurethane to the groove surface, (F) heating the rubber surface of the groove to a temperature in the range of about 80° C. to about 120° C. to dry the adhesive solution, if applied, and to prepare the groove for the next step, (G) while maintaining the temperature of the rubber surface of the groove at a temperature in the range of about 80° C. to about 120° C., applying a hot melt thermoplastic polyurethane to form an inlay therein having a thickness in the range of about 20 to about 80, preferably about 30 to about 50, mils and (H) cooling the composite.

The thermoplastic polyurethane for this invention is prepared from difunctional components. Namely, the thermoplastic polyurethane is prepared by reacting an organic diisocyanate with a polymeric polyether or polyester, preferably polyester, polyol.

Optionally, the thermoplastic polyurethane can be beneficially modified by having its precursor mixture, namely, the diisocyanate and polymeric polyol, to contain about 0.4 to about 0.6 mole of hydroxyl terminated hydrocarbon diol containing 2-8 carbon atoms, per mole of polymeric polyol.

In the polyurethane precursor mixture the ratio of total hydroxyl groups of the polymeric polyol and the optional diol, if used, to the isocyanate (NCO) groups of the isocyanate is in the range of about 0.95/1 to about 1.06/1, preferably about 0.97/1 to about 1.05/1, and more preferably, about 1/1 to about 1.05/1. The purpose is to have the polyurethane precursors essentially fully reacted.

Representative of various suitable diisocyanates are the 2,4- and 2,6-toluene diisocyanates and their mixtures, 4,4'-diphenylmethane diisocyanate, 3,3'-dimethyl-diphenylmethane-4,4'-diisocyanate, 3,3'-bitolylene-4,4'-diisocyanate, isophorone diisocyanate and 4,4'-dicyclohexylmethane diisocyanate. Saturated diisocyanates, with regard to carbon-to-carbon double bonds are preferred such as, for example, 4,4'-dicyclohexylmethane diisocyanate and isophorone diisocyanate. Such saturated diisocyanates are considered better for providing sidewall laminates of the anti-staining type.

Representative of various polymeric polyester polyols are those having a molecular weight in the range of about 1000 to about 4000, preferably about 1500 to about 3500. Such polyester polyols can be prepared by the reaction of a dicarboxylic acid with a saturated, hydroxyl terminated, aliphatic hydrocarbon diol. Representative of such dicarboxylic acids are adipic acid, succinic acid and azelaic acid, with adipic and azelaic acids being preferred. Representative of such hydrocarbon diols are diols having 2 to 8 carbon atoms, such as, for example, ethylene glycol, 1,3-propane diol, 1,4-butane diol, 1,5-pentane diol, 1,6-hexane diol, 1,7-heptane diol and 1,8-octane diol. Another suitable polyester polyol is a polyester of a caprolactone such as the polyester by the reaction of ε-caprolactone with an initiator, such as diethylene glycol.

Although they are not the preferred polymeric polyols, primarily for compatibility and/or solubility reasons, representative of various polyether polyols are those having a molecular weight in the range of about 1000 to about 4000, preferably about 1500 to about 3500, selected from polymers and copolymers of alkylene oxides and hydroxyl terminated hydrocarbon diols selected from at least one of ethylene oxide, propylene oxide, ethylene glycol, 1,3-propane diol and 1,4-butane diol. The ethylene oxide, propylene oxide and ethylene glycol are preferred. Thus, the polymeric polyether polyols can be of the type prepared by (1) polymerizing or copolymerizing alkylene oxides, (2) polymerizing or copolymerizing low molecular weight glycols, (3) or by the reaction of one or more of said alkylene oxides with said glycols.

Representative of said optional hydrocarbon diols are ethylene glycol, 1,3-propane diol, 1,4-butane diol, 1,5-pentane diol, 1,6-hexane diol, 1,7-heptane diol and 1,8-octane diol. The 1,4-butane diol is preferred.

Beneficially, the adhesive solution can be advantageously modified by adding to the thermoplastic polyurethane or thermoplastic polyurethane solution, about 0.5 to about 2.5 weight percent, based on the thermoplastic polyurethane, of an isocyanate polymer having an isocyanate functionality in the range of about 2.1 to about 2.5. Representative of such polymers of diisocyanates are polymers of diisocyanates selected from at least one of 2,4-and/or 2,6-toluene diisocyanate, 4,4'-diphenylmethane diisocyanate, 4,4'-dicyclohexylmethane diisocyanate and isophorone diisocyanate.

If desired, a small amount of chain extender can be used. Representative of such chain extenders are 4,4'-diaminodiphenylsulfone and diglycolamine. An example of such a polyurethane is found in U.S. Pat. No. 3,632,845.

The thermoplastic polyurethane is then blended with the halobutyl rubber by conventional dry mixing method, such as on a mill or in a banbury mixer.

The halobutyl rubber is of the type which can typically be prepared by conventional solution copolymerization of isobutylene and isoprene to form a butyl-type rubbery copolymer containing about 85 to about 95 weight percent isobutylene and correspondingly about 15 to about 5 weight percent isoprene. The isobutylene/isoprene copolymer is then halogenated in solution by conventional methods of the halogenation art, such as by chlorination or bromination, to form the halobutyl rubber containing about 1.7 to about 2.5 and preferably about 1.8 to about 2.4 weight percent halogen and about 0.8 to about 1.8 and preferably about 1 to about 1.5 mole percent unsaturation expressed in units of carbon-to-carbon double bonds per 100 grams of polymer as typically determined by nuclear magnetic resonance analysis.

Chlorobutyl and bromobutyl rubbers are preferred. Bromobutyl rubber has been found to be particularly useful.

Optionally, as hereinbefore pointed out, an adhesive coating can be used within the groove to enhance the adhesion of the polymer blend laminate. It is applied immediately prior to the application of the major polyurethane laminate itself. Such an adhesive is comprised of a mixture of a thermoplastic polyurethane, as hereinbefore already described, and a solvent. Generally, the solvent solution contains about 2 to about 15 weight percent solids. Representative of various suitable solvents are tetrahydrofuran and dimethylformamide. Optionally, the solvent can contain a small amount, such as up to about 10 to about 20 weight percent, of a liquid ketone. Representative of the liquid ketones are acetone, methyl ethyl ketone, diisobutyl ketone, and methyl isobutyl ketone. The adhesive is dried before application of the polymer blend laminate to form a coating usually in the range of about 2 to about 5 mils thick.

The procedure of this invention has several advantages. The colored, typically white, sidewall is applied to the tire after the tire is cured. No solvents are employed except with the adhesive. The sidewall is not applied as a paint but as a thick extrusion. The tire is ready for shipment almost immediately after manufacture. No final buffing is necessary.

The invention may be better understood by inspection of the drawing which is a cross-sectional view of a tire showing its sidewall portion having an adherent polyurethane inlay within a groove.

With reference to the drawing, a cross-section of a pneumatic tire is provided in which is shown the tread 1, spaced bead 2, connecting sidewall 3, and inner-reinforcing carcass 4 containing plies 5 and inner-liner 6.

In particular, the sidewall 3 is shown having scuff ribs 7 and 8 and groove 9.

The molded groove 9 is prepared by first buffing to abrade away and roughen the surface as well as remove any mold release agent and surface oils, the buffing dust removed following which the surface is treated with chlorine water containing about 2 weight percent free chlorine.

After drying, a solvent solution of a thermoplastic polyurethane is applied to the surface of the treated groove and the rubber of the groove heated to a temperature of about 100° C. to dry the adhesive, thereby providing an adhesive coat 10 having a thickness in the range of about 2 to about 5 mils.

While maintaining the temperature of the rubber of the groove, a thermoplastic polyurethane is applied as a hot melt and the composite cooled to form a polyurethane inlay 11 having a thickness of about 0.03 to about 0.06 inches.

The practice of this invention is further illustrated by reference to the following example which is intended to be representative rather than restrictive of the scope of the invention. Unless otherwise indicated, all parts and percentages are by weight.

EXAMPLE

A cured pneumatic rubber tire was provided and identified as a type HR-78×15. Thus, the identification indicated it to be of the size suitably used for a passenger automobile (H), a radial tire (R), having a 78 percent profile or aspect ratio and having a 15-inch rim size.

A groove was ground into the sidewall around its circumference having a width of about 5/8-inch (1.6 cm), and a depth of about 0.04-inch (0.1 cm). With the groove thus having been ground into the sidewall, further buffing was not necessary. The excess buffing or grinding dust was simply blown away in order to clean the groove.

The surface of the ground groove was treated with chlorine water, containing about 2 weight percent free chlorine, by applying the solution to the groove following which it was allowed to dry for a few minutes.

To the treated groove was applied a thermoplastic polyurethane cement mixture comprised of about 100 parts thermoplastic polyurethane and 1500 parts dimethylformamide solvent.

The surface area of the tire around the groove was heated by a heat lamp to a temperature in the range of about 80° C. to about 110° C. in order to dry the adhesive solution to form an adhesive coat in the groove having a thickness of about 2 mils.

While maintaining the heated area around the groove, at a temperature in the range of about 80° C. to about 110° C., a polymer blend was applied by extrusion as a hot melt, to the surface of the groove by a flat faced hot melt applicator shoe. The hot melt was applied at a temperature in the range of about 200° C. to about 230° C. which cooled to form an adherent polymeric inlay having a thickness of about 30 mils (0.76 cm).

The recipe of the sidewall thermoplastic polymer blend stock is shown in the following Table 1.

Table 1

| Compound | Parts |
| --- | --- |
| Thermoplastic polyurethane | 50 |
| Chlorobutyl rubber | 50 |
| Titanium dioxide | 60 |
| Hydrated aluminum silicate | 20 |
| White clay | 20 |
| Antioxidant | 1 |
| Ultraviolet absorber | 1 |

Such a polymeric blend was determined to have a 100 percent modulus at about 25° C. in the range of about 250 to about 450 psig, (about 2 to 4 MN/m$^2$).

The thermoplastic polyurethane used for both the polymer blend and the adhesive was of the type prepared by reacting 4,4'-dicyclohexylmethane diisocyanate with a mixture of a polymeric polyester having a molecular weight of about 1000 prepared by the condensation of 1,4-butane diol with adipic acid, 1,4-butane diol and diglycolamine, according to the following general recipe shown in Table 2.

Table 2

| Compound | Parts |
| --- | --- |
| 4,4'-dicyclohexylmethane diisocyanate | 39.7 |
| polymeric polyester | 100 |
| 1,4-butane diol | 5.4 |
| diglycolamine | 0.95 |

The resulting thermoplastic polyurethane could be characterized by being soluble in dimethyl formamide at 70° C. (at 15 weight percent solids).

To facilitate application of the white colored hot melt inlay and the completing of the colored sidewall circled around the sidewall of the tire by joining the last of the white sidewall stock extruded into the groove with the first of the sidewall stock so applied, the flat-faced, heated extruder-shoe was used.

Such a shoe assembly consisted of a relatively thin, rectangular foot, with its bottom surface being a flat face, connected to the exit end of a tubular extruder, both of which were heated by a heating element. In its operation, the hot melt was charged to one end of the tubular extruder which extruded the hot melt stock, under heat and pressure to and through the shoe applicator. The entire sidewall hot melt stock was extruded through the shoe. An important contribution of the shoe was to form a smooth surfaced, even seal between the last of the stock that is introduced as it is joined with the first of the applied stock. The width of the foot of the flat faced shoe was substantially the width of the groove itself.

The use of the shoe-extruder with its heated flat application surface particularly enhanced the application of the thermoplastic polymer blend to the tire sidewall groove. The shoe applicator acted as an active doctoring device by applying both heat and pressure to the blend to cause it to have a positive intimate contact with the buffed rubber surface. Therefore, as a doctoring device, it both controlled the thickness and width of the polymer blend as well as enhancing its adhesion to the groove. The shoe-extruder both finished and formed a smooth, continuous outer surface of the polymer blend inlay and controlled the material at the edges of the groove to thereby limit its flashing or flowing out of the groove.

In the practice of this invention, the adherent thermoplastic polyurethane inlay can be applied to various of the rubber pneumatic tire sidewalls. Typically, such a sidewall is a cured rubber blend, representative of which are blends of at least two of natural rubber or synthetic cis 1,4-polyisoprene, cis 1,4-polybutadiene, styrene/butadiene rubber, ethylene/propylene/nonconjugated diene rubber, butyl rubber, chlorobutyl rubber and bromobutyl rubber.

In the practice of this invention, although it is taught and preferred that the buffed rubber tire sidewall is treated with chlorine water prior to the application of the laminate and/or adhesive, in some instances such a chlorine water treatment may be optional although it is expected that the adhesion of the polyurethane inlay and/or adhesive would be diminished.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire, having a ground contacting tread portion, spaced beads, and inner-connecting sidewall portions extending radially from said tread portion to said spaced beads and an inner, reinforcing carcass portion extending from bead to bead, at least one of said sidewalls having an adherent outer surface of a polyurethane inlay laminate thereon characterized in that said adherent inlay is provided by applying, as a hot melt, a polymer blend comprised of 100 parts by weight thermoplastic polyurethane, and, about 10 to about 150 parts by weight of an uncured halobutyl rubber, where said polymer blend also contains about 10 to about 150 parts by weight inert fillers and pigments, into a groove in the outer surface of a sidewall of a cured rubber tire and where the said polymer blend, at about 25° C., has a 100 percent modulus in the range of about 100 to about 600 psi and within about 25 percent of the 100 percent modulus of the cured rubber of the sidewall to which it is adhered at 25° C.

2. The pneumatic tire of claim 1, where the polymer blend is applied to the surface of a cured rubber tire sidewall groove by the stepwise method which comprises the steps of (A) buffing the tire sidewall groove to abrade away a portion of the rubber, to roughen the rubber surface and to remove any residual release agents and oils from the surface of cured rubber tire, (B) removing the buffing dust, (C) optionally, cleaning the groove surface with a solvent to remove residual mold release agents and/or oils, if this had not already been accomplished by the preceding buffing operation, (D) treating the buffed surface with chlorine water containing about 0.5 to about 2 weight percent free chlorine and drying the treated rubber, (E) optionally, applying an adhesive of a solvent solution of a thermoplastic polyurethane to the groove surface, (F) heating the rubber surface of the groove to a temperature in the range of about 80° C. to about 120° C. to dry the adhesive solution, if applied, and to prepare the groove for the next step, (G) while maintaining the temperature of the rubber surface of the groove at a temperature in the range of about 80° C. to about 120° C., applying a hot melt thermoplastic polyurethane to form an inlay therein having a thickness in the range of about 30 to about 60 mils and (H) cooling the composite.

3. The pneumatic tire of claim 2 where said thermoplastic polyurethane is prepared by reacting a mixture of an organic diisocyanate, polymeric polyether or polyester polyol and, optionally, saturated, acyclic, hydroxyl terminated hydrocarbon diol having 2 to 8 carbon atoms, with a ratio of total hydroxyl groups of the polymeric polyol and hydrocarbon diol to the NCO groups of the diisocyanate being in the range of about 0.95/1 to about 1.06/1.

4. The pneumatic tire of claim 3 where said halobutyl rubber is selected from chlorobutyl and bromobutyl rubber.

5. The pneumatic tire of claim 4 where, for said thermoplastic polyurethane inlay and optional adhesive, said polyurethane is prepared by reacting a mixture of (A) a diisocyanate selected from at least one of isophorone diisocyanate and 4,4'-dicyclohexylmethane diisocyanate, (B) a polymeric polyester polyol having a molecular weight in the range of about 1000 to about 4000 prepared by (i) the reaction of a dicarboxylic acid selected from at least one of adipic acid and azelaic acid with a a saturated hydrocarbon diol selected from at least one of ethylene glycol, 1,3-propane diol, 1,4-butane diol, 1,5-pentane diol, 1,6-hexane diol, 1,7-heptane diol and 1,8-octane diol or (ii) the reaction of $\Gamma$-caprolactone with a small amount of diethylene glycol initiator and (C) about 0.4 to about 0.6 mole of hydroxyl terminated hydrocarbon diol, per mole of polymeric polyester polyol, selected from at least one of ethylene glycol, 1,3-propane diol, 1,4-butane diol, 1,5-pentane diol, 1,6-hexane diol, 1,7-heptane diol and 1,8-octane diol; where the ratio of the total of the hydroxyl groups of the polymeric polyester polyol and hydrocarbon diol to the NCO groups of the diisocyanate is in the range of about 0.97/1 to about 1.03/1.

6. The pneumatic tire of claim 5 where, when said optional polyurethane adhesive is used, the polyurethane itself is modified by mixing with the adhesive solution about 0.5 to about 2.5 weight percent, based upon the polyurethane of an isocyanate polymer having an isocyanate functionality in the range of about 2.1 to about 2.5 derived from the polymerization of a diisocyanate.

7. The pneumatic tire of claim 6 where, in said optional polyurethane adhesive, said adhesive is modified by adding to its solution a polymer of a diisocyanate selected from at least one of 2,4- and/or 2,6-toluene diisocyanate, 4,4'-diphenyl methane diisocyanate, 4,4'-dicyclohexylmethane diisocyanate and isophorone diisocyanate.

8. The pneumatic tire of claim 5 where said polyurethane has been extended by the addition of a small amount of a chain extender selected from at least one of 4,4'-diaminodiphenylsulfone and diglycolamine.

9. The pneumatic tire of claim 2 where the polymer blend contains about 20 to about 110 parts by weight inert filler and pigments and where said chlorine water treatment is optional.

* * * * *